United States Patent
Hill et al.

(10) Patent No.: US 10,240,220 B2
(45) Date of Patent: Mar. 26, 2019

(54) ELECTRICAL STEEL PROCESSING WITHOUT A POST COLD-ROLLING INTERMEDIATE ANNEAL

(71) Applicants: Theodore E. Hill, Pickerington, OH (US); Eric E. Gallo, Brownsburg, IN (US)

(72) Inventors: Theodore E. Hill, Pickerington, OH (US); Eric E. Gallo, Brownsburg, IN (US)

(73) Assignee: NUCOR CORPORATION, Charlotte, NC (US)

( * ) Notice: Subject to any disclaimer, the term of this patent is extended or adjusted under 35 U.S.C. 154(b) by 813 days.

(21) Appl. No.: 13/739,184

(22) Filed: Jan. 11, 2013

(65) Prior Publication Data

US 2013/0183192 A1 Jul. 18, 2013

Related U.S. Application Data

(60) Provisional application No. 61/586,010, filed on Jan. 12, 2012.

(51) Int. Cl.
| | |
|---|---|
| *C21D 8/02* | (2006.01) |
| *C21D 6/00* | (2006.01) |
| *C21D 9/46* | (2006.01) |

(52) U.S. Cl.
CPC ........... *C21D 8/0226* (2013.01); *C21D 6/008* (2013.01); *C21D 8/0236* (2013.01); *C21D 9/46* (2013.01); *Y02P 10/212* (2015.11)

(58) Field of Classification Search
CPC ..... C21D 8/0226; C21D 8/0236; C21D 6/008
See application file for complete search history.

(56) References Cited

U.S. PATENT DOCUMENTS

| | | | |
|---|---|---|---|
| 3,867,211 A | 2/1975 | Easton | |
| 4,204,890 A | 5/1980 | Irie et al. | |
| 4,421,574 A | 12/1983 | Lyudkovsky | |

(Continued)

OTHER PUBLICATIONS

Vander Voort, George F.. (2004). ASM Handbook, vol. 09—Metallography and Microstructures—63.2.1 Electrical Steels. ASM International. (Year: 2004).*

(Continued)

*Primary Examiner* — Colleen P Dunn
*Assistant Examiner* — Jeremy C Jones
(74) *Attorney, Agent, or Firm* — Moore & Van Allen PLLC; Jeffrey R. Gray (57) ABSTRACT

Embodiments of the present invention comprises melting scrap steel into molten steel; decarburizing the molten steel and adding alloys; transferring the steel to ladles and casting the steel into slabs; hot rolling the slabs into sheets; pickling the sheets; annealing the sheets; cold rolling the sheets; and performing one or more of tension leveling, a rough rolling, or a coating process on the sheets after cold rolling, without an intermediate annealing process between the cold rolling and the tension leveling, the rough rolling, or the coating process. The sheet is sent to the customer for stamping and customer annealing. The new process provides an electrical steel with the similar, same, or better magnetic properties than an electrical steel manufactured using the traditional processing with an intermediate annealing step after cold rolling.

26 Claims, 3 Drawing Sheets

(56) References Cited

U.S. PATENT DOCUMENTS

| | | | |
|---|---|---|---|
| 4,548,655 A * | 10/1985 | Miller | C21D 8/1244 148/111 |
| 5,009,726 A | 4/1991 | Nishimoto et al. | |
| 5,084,112 A | 1/1992 | Tachino et al. | |
| 5,482,107 A | 1/1996 | Judd | |
| 5,609,969 A | 3/1997 | Lauer et al. | |
| 5,798,001 A * | 8/1998 | Anderson | C21D 8/1233 148/112 |
| 5,955,201 A | 9/1999 | Loudermilk et al. | |
| 6,007,642 A | 12/1999 | Gallo | |
| 6,231,685 B1 * | 5/2001 | Anderson | C21D 8/1233 148/111 |
| 6,562,473 B1 | 5/2003 | Okabe et al. | |
| 7,011,139 B2 * | 3/2006 | Schoen | C21D 8/1211 164/417 |
| 2006/0185767 A1 * | 8/2006 | Arita | H01F 1/14775 148/111 |
| 2007/0062611 A1 * | 3/2007 | Murakami | C21D 8/1244 148/111 |
| 2009/0202383 A1 | 8/2009 | Tanaka et al. | |

OTHER PUBLICATIONS

International Preliminary Report on Patentability for International Application No. PCT/US13/21140 completed on Dec. 3, 2013.
International Search Report and Written Opinion for International Application No. PCT/US13/21140 dated Mar. 19, 2013.

* cited by examiner

ELECTRICAL STEEL PROCESSING WITHOUT A POST COLD-ROLLING INTERMEDIATE ANNEAL

CLAIM OF PRIORITY UNDER 35 U.S.C. § 119

The present Application for a Patent claims priority to Provisional Application No. 61/586,010 entitled "Electrical Steel Processing Without A Post-Cold Rolling Anneal" filed Jan. 12, 2012, and assigned to the assignee hereof and hereby expressly incorporated by reference herein.

BACKGROUND

This invention relates generally to the field of semi-processed electrical steel sheet manufacturing, and more particularly embodiments of the invention relate to achieving electrical steel sheet products with the desired magnetic properties after they have been annealed at the customer. Semi-processed electrical steel sheets are different from fully processed electrical steel sheets in that the semi-processed electrical steel sheets manufactured at a steel facility require an additional customer annealing step performed by the customer before the material can be used. Fully processed electrical steel sheets, on the other hand, do not require an additional customer annealing step, and thus, can be used by the customer without further annealing.

BRIEF SUMMARY

The present invention relates to manufacturing semi-processed electrical steel sheets, formed by systems using methods of manufacturing without the need for annealing after cold rolling by the electrical steel sheet manufacturer, and before the customer annealing step.

In various applications, such as electrical motors, lighting ballasts, electrical generators, etc., it may be desirable to use electrical steel products that have high saturation, high permeability, and low core loss properties. However, there comes a point in the production of electrical steel that improving one of these properties becomes a detriment to one or more of these, or other, properties.

The saturation of the electrical steel is an indication of the highest induction that the steel can achieve. The permeability of the electrical steel is the measure of the ability of the steel to support the formation of a magnetic field within itself and is expressed as the ratio of the magnetic flux to the field of strength. Electrical steel with high permeability allows for an increased induction for a given magnetic field, and thus, with respect to motor applications, reduces the need for copper windings, which results in lower copper cost. The core loss is the energy wasted in the electrical steel. Low core loss in electrical steels results in a higher efficiency in the end products, such as motors, generators, ballasts, and the like. Therefore, it may be desirable in many products to use electrical steels with a high ability to support a magnetic field and a high efficiency (e.g., high permeability and low core loss) if it is not detrimental to the cost of manufacturing or other desirable steel properties.

Electrical steel is processed with specific compositions, using specific systems, and using specific methods in order to achieve electrical steels with the desired saturation, permeability, and core loss, as well as other properties. Improving one property may come at the detriment of another. For example, when increasing the permeability a higher core loss may result (and vice versa). Consequently, electrical steels are processed with specific compositions using specific methods in order to optimize the desired magnetic properties.

Electrical steel sheets are typically produced by melting scrap steel or iron in an electric furnace, described as compact strip production (CSP), or processing molten steel from iron ore in a blast furnace, described as integrated production. In the integrated process molten steel is produced in a blast furnace, and in the CSP process the molten steel is produced using an electric furnace (e.g., electric arc furnace, or other like furnace). A decarburizer (e.g., vacuum degasser, argon decarburizer, etc.) is used to create a vacuum, or change the pressure, in order to utilize oxygen to remove the carbon from the molten metal. Thereafter, the molten steel that is at least substantially free of oxygen is sent to a ladle metallurgy facility to add the alloying materials to the steel in order to create the desired steel composition. The steel is then poured into ladles and cast into slabs. The steel slabs are hot rolled (e.g., in one or more stages), annealed, cold rolled (e.g., in one or more stages), and intermediately annealed. Thereafter, the steel sheets are sent to the customer for stamping, and customer annealing in the case of semi-processed steels. These steps occur under various conditions to produce electrical steel sheets with the desired magnetic properties and physical properties (e.g., thickness, surface finish, etc.).

During the hot rolling step the electrical steel sheet is maintained at a temperature above the recrystallization temperature, which is a temperature at which deformed grains are replaced by a new set of unreformed grains. Recrystallization is usually accompanied by a reduction in the strength and hardness of a material and a simultaneous increase in the ductility. The hot rolling process reduces the thickness of the steel sheet and controls the grain structure of the electrical steel.

After the hot rolling stage(s) the steel is potentially pickled in a bath (e.g., sulfuric, nitric, hydrochloric, other acids, or combinations of these, etc.) in order to remove scale on the surface of the steel from oxidization. Thereafter, the electrical steel sheet is annealed to change the magnetic properties of the steel. During annealing the steel is heated, and thereafter cooled, to coarsen the structure of the steel, and improve cold working properties. The electrical steel sheet is then cold rolled after annealing, which comprises rolling the electrical steel sheet below the recrystallization temperature. Cold rolling may begin at room temperatures; however, the temperature of the steel sheet may be elevated at the beginning of the cold rolling process, or otherwise rise during cold rolling due to the cold rolling process itself. The cold rolling process increases the strength of the steel, improves the surface finish, and rolls the steel strip to the desired thickness.

Electrical steel sheets undergoing traditional processing are annealed directly after the cold rolling process in order to recrystallize the steel and achieve the desired permeability and core loss for the electrical steel in the finished product. The annealing process, both before and after cold rolling, can be done via a continuous annealing process or a batch annealing process. In continuous annealing the sheets of steel are passed through a heating furnace and thereafter cooled in a continuous sheet. In batch annealing the steel sheets are coiled into rolls and are heated and cooled in batches of coiled rolls.

Temper rolling, in the case of semi-processed steels, may be performed after annealing in order to improve the surface finish of the electrical steel sheet, enhance the stamping characteristics, and provide improved magnetic properties after the customer has stamped (e.g., punched) the electrical steel sheet and performed a final customer annealing step (e.g., heating the stamped part).

After temper rolling, in the case of semi-processed steels produced using batch annealing, or after continuous annealing of the semi-processed steels, the electrical steel sheet is sent to the customer for further processing. The customer typically stamps the electrical steel sheet into the required shapes, and thereafter, further anneals the stamped shapes in a customer annealing process. The customer anneal is performed by heating the stamped shapes to a specific temperature and letting them cool in order to maximize the magnetic properties of the stamped electrical steel part. The annealing process after stamping is performed by the customer because after stamping the stamped shapes have cold-worked edges and the customer annealing process removes the cold-worked edges, relieves any stress caused by stamping, and maximizes the magnetic properties. Therefore, in traditional semi-processed electrical steel manufacturing there are three annealing steps, a pre-anneal before cold rolling, a post cold rolling intermediate anneal, and a final anneal at the customer. In still other embodiments of the invention annealing steps may also occur between the individual stages of multiple hot rolling or cold rolling passes.

The present invention provides methods and systems that can be used to produce electrical steels with compositions that provide the same, similar, and/or better magnetic properties (e.g., saturation, permeability, and core loss) than steels that are produced using traditional electrical steel processing that utilizes an intermediate annealing step after cold rolling and before additional steel processing, or customer stamping and annealing.

In the present invention, as is the case with traditional electrical steel processing, scrap steel and/or iron is melted into molten steel or molten steel is produced from iron ore; the molten steel is sent for decarburization and for alloy additions; the steel is poured into ladles and cast into slabs (or continuously cast in some embodiments); and the slabs are hot rolled, pickled, annealed (e.g., batch annealed or continuously annealed), and cold rolled into sheets. However, unlike traditional electrical steel processing, in the present invention, the intermediate annealing step (e.g., the batch annealing step, or alternatively, the continuously annealing step) after cold rolling is not performed. Instead, in the present invention, after cold rolling a tension leveling step may be performed or a coating may be applied to the semi-processed electrical steel sheet before it is sent to the customer. At the customer locations, as is the case with the traditional method for manufacturing semi-processed electrical steels, the customers stamp the electrical steel sheets into the desired shapes, and thereafter, perform a customer annealing step to remove distortions created by the stamping and to maximize the magnetic properties of the electrical steel.

One embodiment of the present invention is a method of manufacturing an electrical steel. The method comprises hot rolling steel into a steel sheet in one or more hot rolling passes; annealing the steel sheet after hot rolling; cold rolling the steel sheet in one or more cold rolling passes after the annealing; and wherein the steel sheet is stamped and customer annealed by a customer, without an intermediate annealing process after the cold rolling, and before the stamping and the customer annealing.

In further accord with an embodiment of the invention, the method further comprises performing one or more of a tension leveling, a coating, or a rough rolling process on the steel sheet after the cold rolling and before the stamping and the customer annealing.

In another embodiment of the invention, the composition of the electrical steel comprises silicon (Si) in a range of 0.15-3.5% weight; aluminum (Al) in a range of 0.15-1% weight; manganese (Mn) in a range of 0.005-1% weight; carbon (C) less than or equal to 0.04% weight; antimony (Sb) or tin (Sn) less than or equal to 0.1% weight; and wherein the remainder of the composition of the electrical steel comprises unavoidable impurities and iron.

In still another embodiment of the invention, the composition range of the electrical steel comprises silicon in a range of 1.35-3.0% weight.

In yet another embodiment of the invention, the method further comprises pickling the steel sheet after the hot rolling and before the annealing.

In further accord with an embodiment of the invention, the method further comprises sending the steel sheet to a customer for the stamping and the customer annealing after the stamping.

In another embodiment of the invention, the customer annealing of the steel sheet comprises annealing at a temperature greater than 1550 degrees F.

In still another embodiment of the invention, the annealing of the steel sheet after the hot rolling and before the cold rolling comprises annealing at a temperature greater than 1550 degrees F.

In yet another embodiment of the invention, the electrical steel has higher permeability and similar core loss properties to an electrical steel produced with the same composition and under the same conditions with an intermediate annealing after the cold rolling and before the customer annealing.

Another embodiment of the invention comprises a method of manufacturing an electrical steel. The method comprises hot rolling steel into a steel sheet in one or more hot rolling passes; annealing the steel sheet after hot rolling; cold rolling the steel sheet in one or more cold rolling passes after the annealing; and performing one or more of a tension leveling, a coating, or a rough rolling process on the steel sheet after the cold rolling, without an intermediate annealing process after the cold rolling and before one or more of the tension leveling, the coating, or the rough rolling process.

Another embodiment of the invention comprises an electrical steel. The electrical steel comprises silicon (Si) in a range of 0.15-3.5% weight; aluminum (Al) in a range of 0.15-1% weight; manganese (Mn) in a range of 0.005-1% weight; carbon (C) less than or equal to 0.04% weight; antimony (Sb) or Tin (Sn) less than or equal to 0.1% weight; and wherein the remainder of the composition of the electrical steel comprises unavoidable impurities and iron. The electrical steel is produced by hot rolling steel in one or more hot rolling passes into a steel sheet; annealing the steel sheet after hot rolling; cold rolling the steel sheet in one or more cold rolling passes after the annealing; and wherein the steel sheet is stamped and customer annealed by a customer, without an intermediate annealing process after the cold rolling, and before the stamping and the customer annealing.

In further accord with an embodiment of the invention, the electrical steel is further produced by performing one or more of a tension leveling, a rough rolling, or a coating process on the steel sheet after the cold rolling and before the stamping and the customer annealing.

In another embodiment of the invention, the composition range of the electrical steel comprises silicon in a range of 1.35-3.0% weight.

In still another embodiment of the invention, the electrical steel is further produced by pickling the steel sheet after the hot rolling and before the annealing.

In yet another embodiment of the invention, the electrical steel is further produced by sending the steel sheet to a customer for stamping and customer annealing after the stamping.

In further accord with an embodiment of the invention, the customer annealing of the steel sheet comprises annealing at a temperature greater than 1550 degrees F.

In another embodiment of the invention, the annealing of the steel sheet after hot rolling and before the cold rolling comprises annealing at a temperature greater than 1550 degrees F.

In still another embodiment of the invention, the electrical steel has higher permeability and similar core loss properties to an electrical steel produced with the same composition and under the same conditions with an intermediate annealing after the cold rolling and before the customer annealing.

Another embodiment of the invention comprises an electrical steel. The electrical steel comprises silicon (Si) in a range of 0.15-3.5% weight; aluminum (Al) in a range of 0.15-1% weight; manganese (Mn) in a range of 0.005-1% weight; carbon (C) less than or equal to 0.04% weight; antimony (Sb) or Tin (Sn) less than or equal to 0.1% weight; and wherein the remainder of the composition of the electrical steel comprises unavoidable impurities and iron. The electrical steel is produced by hot rolling steel into a steel sheet in one or more hot rolling passes; annealing the steel sheet after hot rolling; cold rolling the steel sheet in one or more cold rolling passes after the annealing; and performing one or more of a tension leveling, a coating, or a rough rolling process on the steel sheet after cold rolling, without an intermediate annealing process after cold rolling and before one or more of the tension leveling, the coating, or the rough rolling process.

In further accord with an embodiment of the invention, the steel sheet is stamped and customer annealed by a customer after one or more of the tension leveling, the coating, or the rough rolling process.

To the accomplishment of the foregoing and the related ends, the one or more embodiments comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE SEVERAL VIEWS OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Furthermore, the ranges discussed herein are inclusive ranges.

Figure 1A:
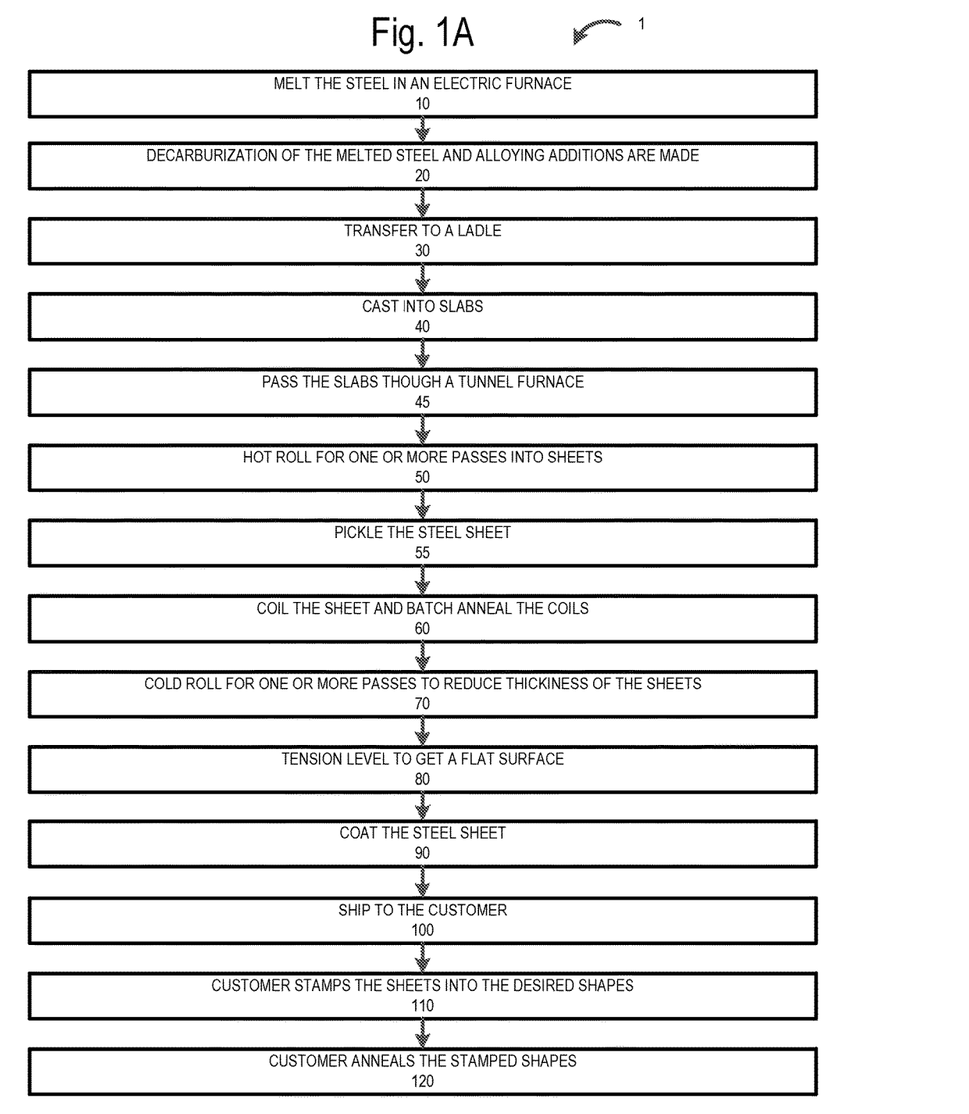
FIG. 1A provides a process flow for producing electrical steel, in accordance with one embodiment of the invention.
Figure 1B:
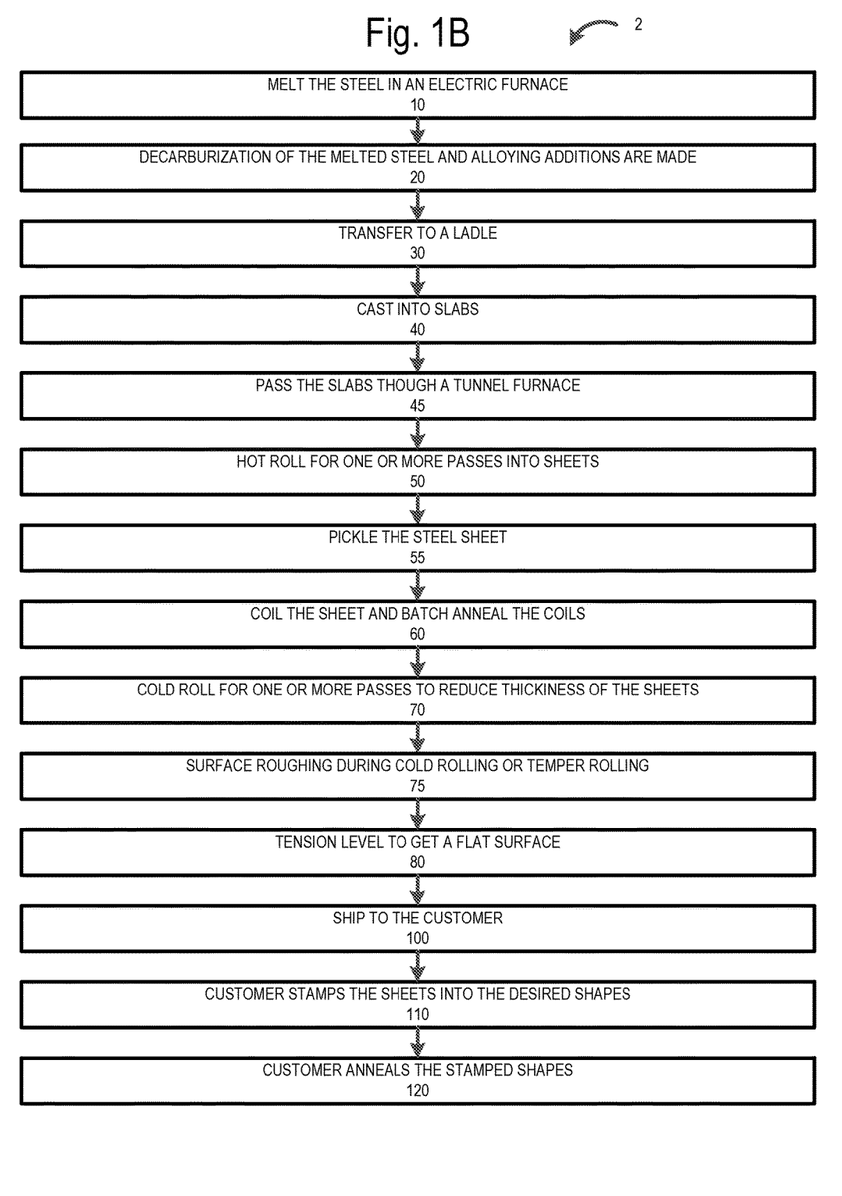
FIG. 1B provides a process flow for producing electrical steel, in accordance with one embodiment of the invention.
Figure 2:
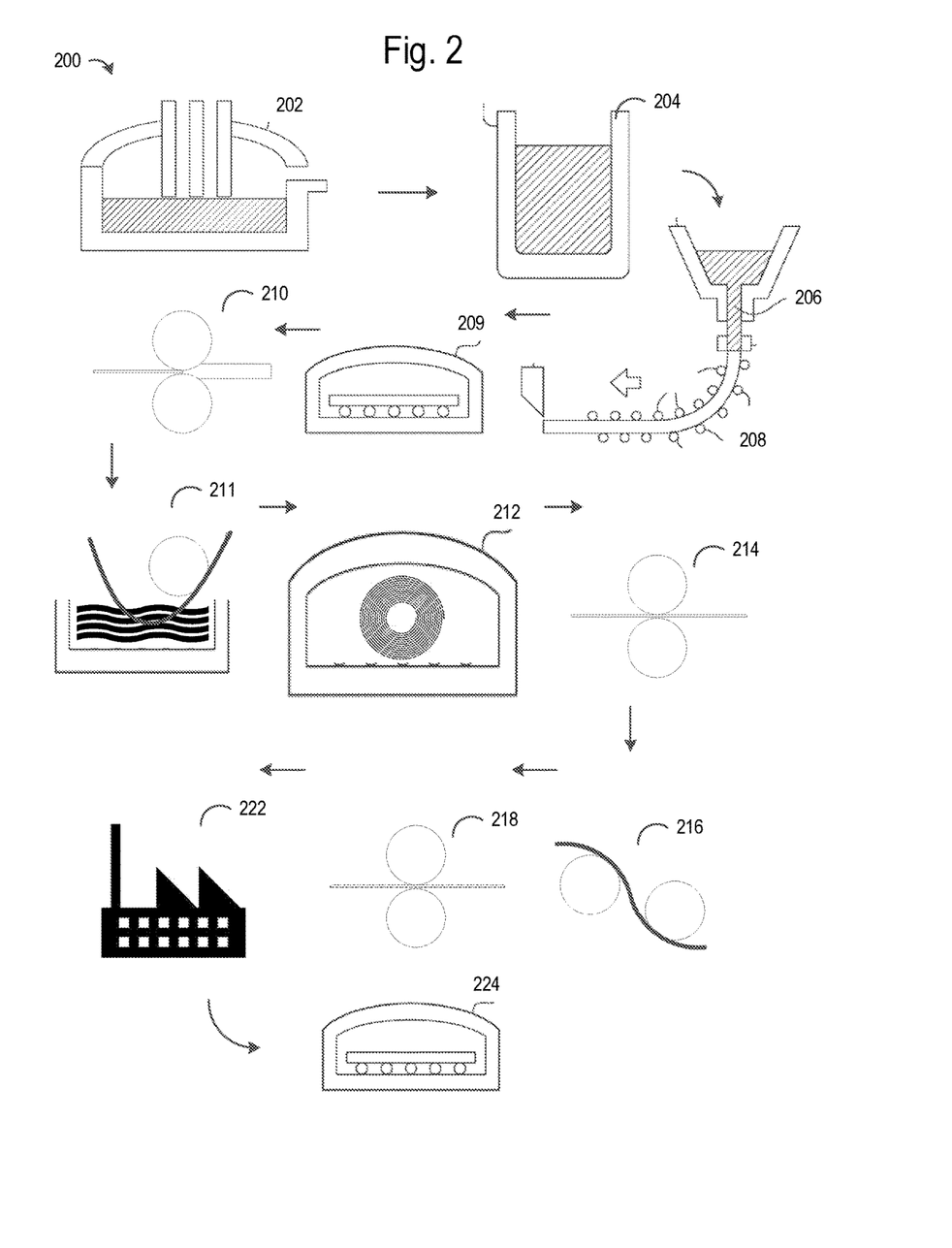
FIG. 2 provides an electrical steel processing system environment in accordance with one embodiment of the invention.

FIGS. 1A and 1B illustrates flow charts for electrical steel production processes 1, 2 for manufacturing electrical steels with desirable magnetic properties (e.g., high saturation, high permeability, and low core loss) without the need for an annealing step (e.g., continuous annealing or batch annealing) directly after cold rolling. FIG. 1A illustrates an electrical steel production process 1 for manufacturing an electrical steel with a tension leveling and/or coating after cold rolling, while FIG. 1B illustrates and electrical steel production process 2 for manufacturing an electrical steel with a surface rouging or temper rolling, and tension leveling after cold rolling. FIG. 2 illustrates an electrical steel processing system environment 200 used in manufacturing the electrical steels in accordance with the process described in FIG. 1.

As illustrated by block 10 in FIGS. 1A and 1B, scrap steel or iron may be melted into molten steel in an electric arc furnace 202, as illustrated in FIG. 2. In other embodiments of the invention other types of furnaces may also be used to produce molten steel from scrap steel. In other embodiments of the invention, molten steel may alternatively be produced from iron ore. As illustrated by block 20 in FIGS. 1A and 1B, the molten steel may be decarburized by removing all, or substantially all, of the oxygen from the molten steel, and thereafter, alloys may be added to produce the desired composition of the electrical steel. The decarburized process step may be performed in a vacuum degasser, argon decarburizer, or other like system, while the alloying additions may be made in a ladle metallurgy facility, or other like system. Embodiments of the compositions of various electrical steels will be described in detail below.

As illustrated in block 30 of FIGS. 1A and 1B, the molten steel is transferred to a ladle 204 as illustrated in FIG. 2. Thereafter, as illustrated by block 40 in FIGS. 1A and 1B the ladle 204 supplies a tundish 206 with the molten steel and the steel is cast 208 into slabs, as illustrated in FIG. 2. After being cast, the slabs may be sent through a tunnel furnace 209 to maintain the desired temperature of the slab, as illustrated by block 45 in FIGS. 1A and 1B, as well as in FIG. 2. Upon exiting the tunnel furnace 209 the slabs may be sent directly to the rolling mill for hot rolling. In other embodiments of the invention the steel may be cast 208 into slabs, allowed to cool, and thereafter, at a later time, sent to a re-heater at the rolling mill before being hot rolled. In still other embodiments of the invention the steel may be continuously cast into a thin steel sheet and thereafter sent for further processing.

As illustrated by block 50 in FIGS. 1A and 1B, the cast slabs are hot rolled into sheets in one or more hot rolling passes through one or more sets of hot rollers 210. As illustrated by block 55, after hot rolling, the formed sheet may be pickled in order to remove scale (e.g., iron flakes that have built up due to oxidation) from the steel sheet. Thereafter, as illustrated by block 60 of FIGS. 1A and 1B the pickled sheet is coiled and sent for batch annealing 212 with one or more other coiled sheets as illustrated in FIG. 2. Alternatively, in some embodiments the sheets may be continuously annealed if the manufacturing facility has a continuous annealing line. As illustrated by block 70 in FIG. 1, after batch annealing 212 (or continuous annealing in alternative processes) the coiled rolls are uncoiled and cold rolled into thinner sheets in one or more cold rolling passes through one or more sets of cold rolls 214, as illustrated in FIG. 2.

After cold rolling, unlike traditional electrical steel processing, the cold rolled electrical steel sheets are not processed using further annealing. The cold rolling process may produce sheets that have wavy edges or buckling throughout the sheet, such that a customer may not be able to use the sheets for end products. In traditional electrical steel processing, annealing the sheets after cold rolling removes the wavy edges and/or buckling from the sheet. However, in the present invention, since there is no annealing step directly after cold rolling the sheet may need to undergo a tension leveling step as illustrated by block 80 in FIG. 1A. During tension leveling penetrating rollers 216, as illustrated in FIG. 2, transform the sheet having wavy edges and/or buckling back into a flat sheet (e.g., no wavy edges or buckling), which may be needed in order to allow a customer to properly feed the sheet through a press for the stamping process. During tension leveling the sheet is bent over and under (or vice versa) the penetrating rollers 216, as illustrated in FIG. 2. The penetrating rolls 216 deform and apply tension to the sheet in order to stretch the sheet to remove the wavy edges and/or buckling.

As illustrated by block 90 in FIG. 1A, after tension leveling a coating may be added to the electrical steel sheet. The coating may be added by running the sheet through a bath or rolling a coating onto the sheet when passing the sheet through a set of coating rolls 218, as illustrated in FIG. 2. The coating (or a rough surface as described below) may be applied to the sheet because when the customer performs an annealing step after the sheet has been stamped, the stamped shapes may stick together such that they may not be separated if the sheet does not have a coating (or a rough surface). Different types of coatings (or rough surfaces) may be applied to the electrical steel sheets depending on the needs of the customer.

In some embodiments of the invention, instead of applying a coating, the electrical steel sheets are produced with a rough surface, as illustrated in FIG. 1B. In some embodiments of the invention, the rough surface may be applied during the cold rolling process using high roughness rolls, as illustrated by block 75 in FIG. 1B. In other embodiments of the invention, instead of applying a rough surface to the electrical steel sheet during cold rolling, the electrical steel sheet may be passed through a temper rolling process (off-line or continuously) after cold rolling and before tension leveling, in order to achieve the desired rough surface, as also illustrated by block 75 in FIG. 1B. In most applications an electrical steel sheet would not be manufactured having both a rough surface and a coating, however, there may be applications where this would be desirable.

Block 100 in FIGS. 1A and 1B illustrates that after the coating is applied to the electrical steel sheet, the sheet is coiled and sent to the customer 222, as illustrated in FIG. 2. As illustrated by block 110, the customer stamps the electrical steel sheet into the desired shapes (e.g., the shapes necessary for use in motor cores, ballast lighting, electrical generators, or the like). Thereafter, the customer may perform a final customer annealing step as illustrated by block 120 in FIGS. 1A and 1B, as is customary in processing semi-processed electrical steels. During the customer annealing step the stamped shapes are heated in a heating furnace 224 to remove stresses and to maximize the final magnetic properties, as illustrated in FIG. 2.

The desired properties (e.g., saturation, permeability, and core loss) produced during the manufacturing process of the electrical steel are dependent, at least in part, on the grain size of the electrical steel, composition, and processing conditions. The grain sizes, compositions, and process conditions of the electrical steels produced using the process of the present invention, for achieving the desired magnetic properties, are described below in more detail in contrast to the traditional processes used for creating electrical steels and the associated magnetic properties obtained from the traditional processing methods. When discussing the properties of the electrical steels herein, the properties are all measured after the final customer annealing step.

In electrical steels processed using traditional manufacturing (e.g., with an annealing step after cold rolling and before the customer annealing step), the electrical steel sheets typically have a grain size in the range of 70 to 150 microns. In the present invention the grain size of electrical steels produced without performing the intermediate annealing step after cold rolling are in the range of 20 to 70 microns, and preferably around 40 microns. The smaller grain size in the present invention helps to create high permeability in the electrical steel because it is easier to magnetize smaller domain structures. Magnetic domain structures are regions within the grains that have the same magnetic orientation. The boundary (e.g., walls) of the domains move when an applied magnetic field changes size or direction. The smaller the grain size the smaller the domain structure, and thus, the easier it is to support the magnetic field. Therefore, the permeability of the magnetic structure is increased.

Alternatively, the smaller grain size may have a negative effect on the core loss, that is, the smaller the grain size the greater the hysteresis portion of core loss realized in the electrical steel. At the lower levels of grain size, such as around 20 microns, the increased core loss may not be ideal for some electrical steels depending on the products in which they are used. Therefore, reducing the grain size in the new process to 20 to 70 microns from the 70-150 microns seen in traditional processing, may greatly improve permeability with only a minor increase in core loss. The optimal grain size for electrical steel sheets in some products, such as motors, may be around 40 (e.g., 30 to 50) microns in order to achieve the desired permeability and core losses.

The grain texture may also play a role in improving the permeability and reducing the core loss. The grain texture is described as the orientation of the grains. Developing non-orientated electrical steels with improved grain texture (e.g., more orientated grains in various directions) may increase the permeability and/or reduce the core loss.

The grain size, and thus, the magnetic properties of the electrical steels can be controlled, in part, by the composition of the electrical steels. The compositions of the electrical steels used in the present invention may have the ranges disclosed in Table 1. The ranges disclosed in Table 1 illustrate examples of the percent weight of Silicon, Aluminum, Manganese, Carbon, and/or Antimony that provide the desired electrical steel sheets with high permeability and low core loss using the process of the present invention that excludes the intermediate annealing step after cold rolling and before the customer annealing step. In other embodiments of the invention smaller ranges of these elements may be more acceptable in producing the desired high permeability and low core loss. Furthermore, in some embodiments of the invention Tin (Sn) may replace Antimony (Sb) or be used in combination with Antimony, to achieve the desired magnetic properties. The composition of Sn may be less than or equal to 0.1% weight. In other embodiments of the invention various combinations of the elements in Table 1, as well as other elements (e.g., Sn, etc.), may be used to produce electrical steels with the desired magnetic properties without the need for the intermediate annealing step directly after cold rolling and before customer annealing. For example, in some embodiments only the silicon, aluminum, and manganese alloys are controlled and/or added to the molten steel. In still other embodiments of the invention only the silicon is controlled and/or added, and thus, the other elements are not controlled and/or added outside of any unavoidable impurities. In the embodiments presented herein the compositions may have one or more other elements that are present as unavoidable impurities with the remainder of the compositions comprising iron.

TABLE 1

Range of Elements for Desired Electrical Steel Permeability and Core Loss Properties

| Element | Composition (by weight percent) |
| --- | --- |
| Silicon (Si) | 0.15-3.5% |
| Aluminum (Al) | 0.15-1% |
| Manganese (Mn) | 0.005-1% |
| Carbon (C) | <=0.04% |
| Antimony (Sb) | <=0.1% |

The amount of silicon used in the electrical steel controls many aspects of the magnetic properties of the electrical steel. Silicon may be added to electrical steels to raise the resistivity of the material and concurrently reduce the eddy current loss component of the core loss. Alternatively, the lower the silicon level the higher the permeability and the higher the saturation. Thus, there is also a benefit to reducing the silicon in order to increase the permeability and allow the electrical steel to more easily support a magnetic field. Furthermore, the purer the electrical steel the higher the saturation level, and thus, the more magnetic induction can occur.

In the present invention the removal of the annealing step after cold rolling results in a minor degradation in core loss (e.g., core loss increases a small amount), but the permeability is much higher than electrical steels processed using traditional methods. The small degradation in core loss can be recovered by increasing the level of silicon, such that the final product produced using the process in the present invention can have the same or better core loss and much better permeability than electrical steels produced using the traditional processes that incorporate an intermediate annealing step after cold rolling and before stamping and annealing at the customer.

The processing conditions may also have an impact on the magnetic properties of the electrical steel. The ranges of conditions for processing the electrical steel in the present invention may vary based on the composition of the steels and/or magnetic properties desired. Examples of the ranges of processing temperatures are provided in Table 2A.

TABLE 2A

Conditions for Producing the Electrical Steels with the Desired Permeability and Core Loss

| Process Step | Temperature Range |
| --- | --- |
| Tunnel Furnace Exit Temperature | 1800 to 2300 Degrees F. |
| Hot Rolling Finish Temperature | 1450 to 1800 Degrees F. |
| Coiling Temperature | 900 to 1500 Degrees F. |
| Batch Anneal Soak Temp (in lieu of Continuous Anneal) | 1000 to 1900 Degrees F. |
| Continuous Anneal Temp (in lieu of Batch Anneal) | 1400 to 2000 Degrees F. |
| Cold Rolling Temperature | Ambient (May need >100 F. for Si >2.0%) |
| Customer Anneal | 1400 to 1675 F., or greater, for 45 min. to 1 hour |

Table 2B illustrates temperature ranges, which are narrower than the ranges described in Table 2A, in accordance with other embodiments of the processing conditions for manufacturing the electrical steels with the magnetic properties described herein. In still other embodiments of the invention the ranges of conditions for processing the electrical steels in the present invention may be a combination of the ranges describe in Tables 2A and 2B, or outside of the ranges described in Tables 2A and 2B.

TABLE 2B

Conditions for Producing the Electrical Steels with the Desired Permeability and Core Loss

| Process Step | Temperature Range |
| --- | --- |
| Tunnel Furnace Exit Temperature | 1800 to 2150 Degrees F. |
| Hot Rolling Finish Temperature | 1500 to 1700 Degrees F. |
| Coiling Temperature | 950 to 1450 Degrees F. |
| Batch Anneal Soak Temp (in lieu of Continuous Anneal) | 1000 to 1550 Degrees F. |
| Continuous Anneal Temp (in lieu of Batch Anneal) | 1550 to 1900 Degrees F. |
| Cold Rolling Temperature | Ambient (May need >100 F. for Si >2.0%) |
| Customer Anneal | 1450 to 1550 F., or greater, for 45 min. to 1 hour |

The core loss is also a function of the thickness of the electrical steel sheet. After hot rolling, the electrical steel sheet may have a thickness between 0.060" to 0.120". After cold rolling, the electrical steel sheet may have a thickness between 0.005" to 0.035." The thinner the final thickness of the steel sheet the lower the core loss and the better the efficiency of the electrical steel. In other embodiments of the invention, the thickness of the electrical steel sheet after hot rolling and cold rolling may be outside of these ranges.

The following examples illustrate the improved magnetic properties that may be achieved using the present invention. As a first example, electrical steel of the composition illustrated in Table 3 was processed using the traditional process versus the process of the present invention according to the processing temperatures illustrated in Table 4. The resulting electrical properties of the electrical steels are contrasted in Table 5. As disclosed in Table 3, the electrical steels tested in this example had a silicon composition of 1.35% weight.

TABLE 3

Composition of Electrical Steel Tested - 1.35% Si Sample

| Element | Composition (by weight percent) |
|---|---|
| Silicon | 1.35% |
| Aluminum | 0.33% |
| Manganese | 0.65% |
| Carbon | 0.005% |
| Antimony | 0.065% |

TABLE 4

Conditions for Producing The Electrical Steel - 1.35% Si Sample

| Process Step | Temperature | Product Thickness |
|---|---|---|
| Tunnel Furnace Exit Temperature | 2000 Degrees F. | 2.0" |
| Hot Rolling Finish Temperature | 1550 Degrees F. | 0.080" |
| Coiling Temperature | 1000 Degrees F. | 0.080" |
| Batch Anneal Soak Temperature | 1530 Degrees F. | 0.080" |
| Cold Rolling Temperature | Ambient | 0.0197" |
| Batch Anneal Soak Temperature (For Traditional Process ONLY) | 1240 Degrees F. | 0.0197" |
| Customer Anneal | 1450 Degrees F. for one hour at 55 Degrees F. Dewpoint | 0.0197" |

TABLE 5

Electrical Steel Properties - 1.35% Si Sample

| Properties | New Process (1 Sample in 4 areas) | Traditional Process (10 Samples in various areas) |
|---|---|---|
| Core Loss | 1.99-2.05 W/lb | 1.81-1.93 W/lb |
| Permeability | 3180-3429 Gauss/Oersted | 1716-1944 Gauss/Oersted |

Table 5 provides the ranges of core loss and permeability for electrical steels produced using the process of the present invention versus electrical steels produced using the traditional process that utilizes an annealing step after cold rolling and before customer annealing. All of the electrical steels tested in Table 5 had the same compositions, as illustrated in Table 3, were produced using the conditions illustrated in Table 4 (e.g., new process or traditional process), and were tested at the universal standard of 1.5 Tesla @ 60 Hz. Table 5 illustrates that the core loss using the new process only slightly increased to 1.99-2.05 W/lb from 1.81-1.93 W/lb using the traditional process, while the permeability using the new process greatly increased to a range of 3180-3429 G/Oe from 1716-1944 G/Oe using the traditional process. As illustrated by Table 5, the electrical steels produced using the new process have magnetic properties with a slightly increased core loss and much better permeability than the electrical steels produced using the traditional processing methods.

By increasing the silicon level in the composition and using the new processing method of the present invention, electrical steels may be produced that have the same or lower core loss and higher permeability while removing the need for an intermediate annealing step directly after cold rolling, as explained in further detail below with respect to Tables 6, 7, and 8.

As a second example, Table 8 provides the ranges of core loss and permeability for electrical steels produced using the process of the present invention versus electrical steels produced using the traditional process that utilizes an intermediate annealing step after cold rolling. The electrical steels tested had the same compositions, as illustrated in Table 6, were produced using the conditions illustrated in Table 7 (with the exception of the customer annealing temperature), and were tested at the universal standard of 1.5 Tesla @ 60 Hz. Table 8 illustrates that the core loss using the new process only slightly increased to 1.58-1.63 W/lb from 1.50-1.54 W/lb using the traditional process, while the permeability using the new process greatly increased to a range of 2379-2655 G/Oe from 1259-1318 Ga/Oe using the traditional process. As illustrated by Table 8, the electrical steels produced using the new process have magnetic properties with a slightly increased core loss and much better permeability than the electrical steels produced using the traditional processing methods as explained below.

TABLE 6

Composition of Electrical Steel Tested - 2.24% Si Sample

| Element | Composition (by weight percent) |
|---|---|
| Silicon | 2.24% |
| Aluminum | 0.41% |
| Manganese | 0.35% |
| Carbon | 0.005% |
| Antimony | 0.066% |

TABLE 7

Conditions for Producing The Electrical Steel - 2.24% Si Sample

| Process Step | Temperature | Product Thickness |
|---|---|---|
| Tunnel Furnace Exit Temperature | 2000 Degrees F. | 2.0" |
| Hot Rolling Finish Temperature | 1550 Degrees F. | 0.080" |
| Coiling Temperature | 1000 Degrees F. | 0.080" |
| Batch Anneal Soak Temperature | 1530 Degrees F. | 0.080" |
| Cold Rolling Temperature | Ambient | New process = 0.0193-0.0197" Traditional Process ≈ 0.0187" |
| Batch Anneal Soak Temperature (For Traditional Process ONLY) | 1240 Degrees F. | New process = 0.0193-0.0197" Traditional Process ≈ 0.0187" |
| Customer Anneal | 1550 Degrees F. for the new process (1450 Degrees for the traditional process) for one hour at 55 Degrees F. Dewpoint | New process = 0.0193-0.0197" Traditional Process ≈ 0.0187" |

TABLE 8

Electrical Steel Properties

| Properties | New Process (1 Sample at head and tail) | Traditional Process (1 Sample at head and tail) |
|---|---|---|
| Core Loss | 1.58-1.63 W/lb | 1.50-1.54 W/lb |
| Permeability | 2379-2655 Gauss/Oersted | 1259-1318 Gauss/Oersted |

As disclosed in Table 6, the electrical steel produced had a silicon composition of 2.24% weight, which was an increase of 0.89% weight over the composition tested in Table 3. Furthermore, the composition of Aluminum in the steel increased from 0.33% weight to 0.41% weight, the composition of Manganese decreased from 0.65% weight to 0.35% weight, while the composition of Carbon and Antimony did not change or had only minor differences between the steel tested in Table 3 and the steel tested in Table 6.

Table 7 illustrates the process conditions for producing the electrical steel with the 2.24% Si weight composition. As illustrated in Table 7, the process conditions are the same as previously described with respect to Table 4 except for the increase in the customer annealing temperature from 1450 degrees F. using the traditional process to 1550 degrees F. for the new process without the intermediate annealing step after cold rolling. As explained in further detail later, the increase in the customer annealing temperature may also play a role in improving the magnetic properties of the electrical steel (e.g., reducing the core loss and/or improving the permeability). There is also a minor difference in the samples tested for the 2.24% Si steel using the new process and the sample tested for the 2.24% Si steel using the traditional process, in that the steel tested in the new process is slightly thicker than the steel tested using the traditional process. The small differences in thickness may have a small effect on the magnetic properties of the electrical steel. However, small changes in thicknesses may also occur over the span of a steel sheet itself, and thus, may only negligibly affect the magnetic properties of the steel. For example, with respect to the steel manufactured using the new process, Table 7 illustrates that the head of the steel sheet (near the leading edge of the sheet) has a thickness of 0.0197," while the tail of the steel sheet (near the lagging edge of the sheet) has a thickness of 0.0193." As illustrated in Table 8, this difference in thickness may affect the core loss and permeability, such that core loss and permeability at the head may be 1.58 w/lb and 2379, while the core loss and permeability at the tail may be 1.63 w/lb and 2655.

As was the case with the first example, illustrated in Tables 3-5, in the second example, as illustrated in Tables 6-8, the electrical steels produced using the new process have magnetic properties with a slightly increased core loss and much better permeability than the electrical steels produced using the traditional processing methods.

As described throughout the specification in order to improve the magnetic properties of the steel over the traditional processing methods, steel may be produce using the new process without an intermediate step of annealing after cold rolling and before the optional steps of tension leveling and coating or temper rolling, as well as before the customer annealing step.

As illustrated by the examples set forth herein, by removing the intermediate annealing step after cold rolling and increasing the amount of silicon in the steel, the present invention has improved upon the magnetic properties found in the electrical steels processed in the traditional way using an intermediate annealing step after cold rolling and before the customer annealing step. This point is illustrated in a comparison of Table 5 and Table 8, which illustrates that by using the new processing method and increasing the Si composition from 1.35% weight to 2.24% weight, improved magnetic properties can be achieved that result in both improved core loss (illustrated as a reduction in core loss from the range of 1.81-1.93 W/lb to the range of 1.58-1.63 W/lb) and improved permeability (illustrated as an increase in permeability from the range of 1716-1944 Gauss/Oersted to the range of 2379-2655 Gauss/Oersted).

Table 9 further illustrates the changes in core loss and permeability as the Si content of a steel increases and as the customer annealing temperature increases. As explained herein, core loss generally improves (illustrated as decrease in core loss) as Si content increases, except when reaching the higher end the in the Si range (0.15-3.5%). As illustrated in Table 9, when the Si content reaches levels of approximately 2.6% to 3.5% the core loss may generally degrade (illustrated as an increase in core loss). The effects of the degraded core loss at the elevated Si levels may be mitigated or reversed by increasing the customer annealing temperature. As illustrated in Table 9, as the customer annealing temperature is raised from 1450 degrees F. to 1550 degrees F. the core loss improves (illustrated as a decrease in core loss) across the ranges of Si from 2.2%-3.0%, such that the core loss only has slight variations with the changing Si levels at the higher annealing temperatures. Furthermore, core loss may be improved across the entire range of Si content when the customer annealing temperature increases, however, this benefit may be more noticeable as the level of Si increases. In some embodiments of the invention the annealing temperature may be increased up to 1600 degrees F. or 1700 degrees F., or more, in order to improve the core loss (illustrated as a decrease in value of the core loss).

TABLE 9

Si Content vs. Properties vs. Intermediate Batch Annealing Temperatures For 0.0198" Thickness

| | 1450 F. Customer Annealing | | 1550 F. Customer Annealing | |
|---|---|---|---|---|
| Si Content | Core Loss | Permeability | Core Loss | Permeability |
| 2.2% | 1.79 W/lb | 2436 G/Oe | 1.61-1.67 W/lb | 2328-2645 G/Oe |
| 2.6% | 1.69-1.71 W/lb | 2215-2308 G/Oe | 1.62-1.63 W/lb | 2175-2191 G/Oe |
| 3.0% | 1.71-1.81 W/lb | 1665-1733 G/Oe | 1.64-1.70 W/lb | 1592-1745 G/Oe |

The improvement to the core loss by increasing the customer annealing temperature is also present at various sheet thicknesses. Table 10 illustrates the changes in magnetic properties of a 2.2% Si steel having a thickness of 0.0147" between customer annealing processes taking place at 1470 degrees F. and at 1550 degrees F. As illustrated in Table 10, as the customer annealing temperature increases the core loss decreases. Moreover, additional improvements in core loss or permeability may be realized by further increasing the customer annealing temperature to greater than 1600 degrees F., 1700 degrees F., or more. Furthermore, this improvement may occur at other levels of Si content (e.g., Si from 0.15 to 3.5%). Moreover a comparison of the 2.2% Si electrical steel of Table 9 and the 2.2% Si electrical steel of Table 10 illustrates that as the thickness of the electrical steel sheet is reduced the core loss is improved (e.g., it decreases), with a small degradation in the permeability (e.g., it decreases).

TABLE 10

Properties vs. Customer Annealing Temperatures For Approximately 0.0147" Thickness

| Si Content | 1470 F. Customer Annealing | | 1550 F. Customer Annealing | |
|---|---|---|---|---|
| | Core Loss | Permeability | Core Loss | Permeability |
| 2.2% | 1.525 W/lb | 2149 G/Oe | 1.380-1.396 W/lb | 2312-2343 G/Oe |

In still other embodiments of the invention improvements in core loss and permeability may be achieved as the Si content of a steel increases by increasing the annealing temperature between hot-rolling and cold-rolling. As explained herein, core loss generally improves (illustrated as decrease in core loss) as Si content increases, except when reaching the higher end of the Si range (0.15-3.5%), for example, with an Si content of approximately 2.6% to 3.5%, the core loss may generally degrade (illustrated as an increase in core loss). The effects of the degraded core loss at the elevated Si levels may be mitigated or reversed by increasing the temperature of the annealing process between hot-rolling and cold-rolling. For example, increasing the annealing temperature to greater than 1600 degrees F., 1700 degrees F., or more.

By controlling the processing times, processing temperatures, and steel compositions within the new process, electrical steels with the desired magnetic properties required by the customers are developed without the need for an intermediate annealing step after cold rolling and before the customer stamping and customer annealing process. In some embodiments of the invention it is also noted that adding a coating may further improve the permeability of the electrical steel.

Another difference between electrical steels produced using traditional processing methods and electrical steels produced without an intermediate annealing step directly after cold rolling is that in the present invention the electrical steels are harder. For example, in the present invention the Rb hardness, which is a standardize hardness measurement, of the electrical steel may generally be in the range of 90 to 100 (or in some embodiments outside of this range), or more specifically in the high 90's. Alternatively, the hardness of the electrical steels manufactured using the traditional method may be 50 to 80 Rb.

While certain exemplary embodiments have been described herein, and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method of manufacturing a stamped part formed from an electrical steel, the method comprising:
   hot rolling a steel slab in one or more hot rolling passes into a steel sheet;
   annealing the steel sheet after the hot rolling, wherein the annealing after the hot rolling is a batch annealing process, and wherein the annealing after the hot rolling is performed at a post hot rolling annealing temperature that is greater than or equal to 1550 degrees Fahrenheit;
   cold rolling the steel sheet in one or more cold rolling passes after the annealing after the hot rolling; and
   wherein the steel sheet is stamped into the stamped part and annealed after stamping without an intermediate annealing process after the cold rolling and before the stamping and the annealing after the stamping, and wherein the annealing after the stamping is performed at a post stamping annealing temperature that is greater than or equal to 1550 degrees Fahrenheit;
   wherein the stamped part comprises:
      silicon (Si) in a range of 2.0-2.6% weight;
      aluminum (Al) in a range of 0.15-1% weight;
      manganese (Mn) in a range of 0.005-1% weight;
      carbon (C) less than or equal to 0.04% weight;
      antimony (Sb) or Tin (Sn) less than or equal to 0.1% weight; and
      wherein the remainder of the composition of the stamped part comprises unavoidable impurities and iron; and
   wherein the stamped part has a permeability greater than or equal to 2000 G/Oe and a core loss less than or equal to 1.8 W/lb after the annealing after the stamping in all directions in the stamped part.

2. The method of claim 1, further comprising:
   performing one or more of a tension leveling, a coating, or a rough rolling process on the steel sheet after the cold rolling and before the stamping and the annealing after the stamping.

3. The method of claim 1, wherein grain size of the stamped part ranges from 20 to 70 microns.

4. The method of claim 1, further comprising pickling the steel sheet after the hot rolling and before the annealing after the hot rolling.

5. The method of claim 1, further comprising:
   sending the steel sheet to a customer for the stamping and the annealing after the stamping.

6. The method of claim 1, wherein the post hot rolling annealing temperature is greater than or equal to 1700 degrees Fahrenheit.

7. The method of claim 1, wherein the post stamping annealing temperature is greater than or equal to 1700 degrees Fahrenheit.

8. A method of manufacturing a stamped part formed from an electrical steel, the method comprising:
   hot rolling a steel slab in one or more hot rolling passes into a steel sheet;
   annealing the steel sheet after the hot rolling, wherein the annealing after the hot rolling is a batch annealing process, and wherein the annealing after the hot rolling is performed at a post hot rolling annealing temperature that is greater than or equal to 1550 degrees Fahrenheit;
   cold rolling the steel sheet in one or more cold rolling passes after the annealing after the hot rolling;
   wherein the steel sheet is stamped into the stamped part and annealed after stamping without an intermediate annealing process after the cold rolling and before the stamping and the annealing after the stamping, and wherein the annealing after the stamping is performed at a post stamping annealing temperature that is greater than or equal to 1550 degrees Fahrenheit;
   wherein the stamped part comprises:
      silicon (Si) in a range of 2.6-3.5% weight;
      aluminum (Al) in a range of 0.15-1% weight;
      manganese (Mn) in a range of 0.005-1% weight;
      carbon (C) less than or equal to 0.04% weight;
      antimony (Sb) or Tin (Sn) less than or equal to 0.1% weight; and
      wherein the remainder of the composition of the stamped part comprises unavoidable impurities and iron; and
   wherein the stamped part has a permeability greater than or equal to 1400 G/Oe and a core loss less than or equal to 1.8 W/lb after the annealing after the stamping in all directions in the stamped part.

9. The method of claim 8, further comprising:
performing one or more of a tension leveling, a coating, or a rough rolling process on the steel sheet after the cold rolling and before the stamping and the annealing after stamping.

10. The method of claim 8, further comprising pickling the steel sheet after the hot rolling and before the annealing after the hot rolling.

11. The method of claim 8, further comprising:
sending the steel sheet to a customer for the stamping and the annealing after the stamping.

12. The method of claim 8, wherein the post hot rolling annealing temperature is greater than or equal to 1700 degrees Fahrenheit.

13. The method of claim 8, wherein the post stamping annealing temperature is greater than or equal to 1700 degrees Fahrenheit.

14. The method of claim 8, wherein grain size of the stamped part ranges from 20 to 70 microns.

15. A stamped part formed from an electrical steel, the stamped part comprising:
silicon (Si) in a range of 2.0-2.6% weight;
aluminum (Al) in a range of 0.15-1% weight;
manganese (Mn) in a range of 0.005-1% weight;
carbon (C) less than or equal to 0.04% weight;
antimony (Sb) or Tin (Sn) less than or equal to 0.1% weight; and
wherein the remainder of the composition of the stamped part comprises unavoidable impurities and iron;
wherein the stamped part is formed from a steel sheet that is produced by:
hot rolling a steel slab in one or more hot rolling passes into the steel sheet;
annealing the steel sheet after the hot rolling, wherein the annealing after the hot rolling is a batch annealing process, and wherein the annealing after the hot rolling is performed at a post hot rolling annealing temperature that is greater than or equal to 1550 degrees Fahrenheit;
cold rolling the steel sheet in one or more cold rolling passes after the annealing after the hot rolling; and
wherein the steel sheet is stamped into the stamped part and annealed after stamping without an intermediate annealing process after the cold rolling and before the stamping and the annealing after the stamping, and wherein the annealing after the stamping is performed at a post stamping annealing temperature that is greater than or equal to 1550 degrees Fahrenheit; and
wherein the stamped part has a permeability greater than or equal to 2000 G/Oe and a core loss less than or equal to 1.8 W/lb after the annealing after the stamping in all directions of the stamped part.

16. The stamped part of claim 15, wherein the steel sheet is further produced by performing one or more of a tension leveling, a rough rolling, or a coating process on the steel sheet after the cold rolling and before the stamping and the annealing after the stamping.

17. The stamped part of claim 15, wherein the steel sheet is further produced by pickling the steel sheet after the hot rolling and before the annealing after the hot rolling.

18. The stamped part of claim 15, wherein the post hot rolling annealing temperature is greater than or equal to 1700 degrees Fahrenheit.

19. The stamped part of claim 15, wherein the post stamping annealing temperature is greater than or equal to 1700 degrees Fahrenheit.

20. The stamped part of claim 15, wherein grain size of the stamped part ranges from 20 to 70 microns.

21. A stamped part formed from an electrical steel, the stamped part comprising:
silicon (Si) in a range of 2.6-3.5% weight;
aluminum (Al) in a range of 0.15-1% weight;
manganese (Mn) in a range of 0.005-1% weight;
carbon (C) less than or equal to 0.04% weight;
antimony (Sb) or Tin (Sn) less than or equal to 0.1% weight; and
wherein the remainder of the composition of the stamped part comprises unavoidable impurities and iron;
wherein the stamped part is formed from a steel sheet that is produced by:
hot rolling a steel slab in one or more hot rolling passes into the steel sheet;
annealing the steel sheet after the hot rolling, wherein the annealing after the hot rolling is a batch annealing process, and wherein the annealing after the hot rolling is performed at a post hot rolling annealing temperature greater than or equal to 1550 degrees Fahrenheit;
cold rolling the steel sheet in one or more cold rolling passes after the annealing after the hot rolling; and
wherein the steel sheet is stamped into the stamped part and annealed after stamping without an intermediate annealing process after the cold rolling and before the stamping and the annealing after stamping, and wherein the annealing after the stamping is performed at a post stamping annealing temperature that is greater than or equal to 1550 degrees Fahrenheit; and
wherein the stamped part has a permeability greater than or equal to 1400 G/Oe and a core loss less than or equal to 1.8 W/lb in all directions of the stamped part.

22. The stamped part of claim 21, wherein the steel sheet is further produced by performing one or more of a tension leveling, a coating, or a rough rolling process on the steel sheet after the cold rolling and before the stamping and the annealing after the stamping.

23. The stamped part of claim 21, wherein the steel sheet is further produced by pickling the steel sheet after the hot rolling and before the annealing after the hot rolling.

24. The stamped part of claim 21, wherein the post hot rolling annealing temperature is greater than or equal to 1700 degrees Fahrenheit.

25. The stamped part of claim 21, wherein the post stamping annealing temperature is greater than or equal to 1700 degrees Fahrenheit.

26. The stamped part of claim 21, wherein grain size of the stamped part ranges from 20 to 70 microns.

\* \* \* \* \*